United States Patent [19]
Koch et al.

[11] 3,773,599
[45] Nov. 20, 1973

[54] DEVICE FOR THE PREPARATORY TREATMENT OF FOIL WEBS OR STRIPS OF SYNTHETIC MATERIAL

[75] Inventors: Heinrich Koch, Jakobstr. 88, Siegburg, Germany; Heinz Staneck, Siegburg, Germany

[73] Assignee: said Koch, by said Staneck, Siegburg, Germany

[22] Filed: Mar. 4, 1971

[21] Appl. No.: 120,869

[30] Foreign Application Priority Data
Mar. 5, 1970   Germany............... P 20 10 415.8

[52] U.S. Cl.................. 156/515, 83/171, 83/665
[51] Int. Cl........................ B32b 31/00, B27b 7/06
[58] Field of Search................. 156/510, 512, 515, 156/582, 251; 83/663, 965, 171

[56] References Cited
UNITED STATES PATENTS
3,083,757   4/1963   Kraft et al........................... 156/251
2,229,121   1/1941   Nye et al............................ 156/251
3,510,380   5/1970   Bittner et al....................... 156/251
3,585,097   6/1971   Beason............................... 156/582
3,075,573   1/1963   Piazze................................ 156/583

Primary Examiner—Douglas J. Drummond
Attorney—Walter Becker

[57] ABSTRACT

A device for the preparatory treatment of foil webs and foil strips of synthetic material in which a heated grate roller journalled unilaterally or at both ends cooperates with one or more outer pressure rollers while the grate bars or webs of the grate roller are sharp-edged at the peripheral surface of the roller and have a cross-section which increases toward the inner chamber of the grate roller and thus define free passages which toward the interior of the grate roller are of a funnel shape.

3 Claims, 4 Drawing Figures

Patented Nov. 20, 1973  3,773,599

INVENTORS:
Heinrich Koch
Heinz Staneck
By

Patented Nov. 20, 1973 3,773,599

INVENTORS:
Heinrich Koch
Heinz Staneck
By
Walter Becker

DEVICE FOR THE PREPARATORY TREATMENT OF FOIL WEBS OR STRIPS OF SYNTHETIC MATERIAL

The present invention relates to a device for the preparatory treatment of foil webs or strips of synthetic material which webs or strips are subsequently refined in an extruder. When producing and processing foil webs of synthetic material, rejects as well as waste are encountered. Inasmuch as the synthetic material does not lose its basic properties during the generating process, there is the general endeavor to regenerate the rejects as well as the water to regain the basic material.

A number of devices have become known by means of which rejects as well as waste can be regenerated. A heretofore known such device concerns a beater or crusher mill in which the foils or the water material is diminished and subsequently mixed in a dry mixer until, due to the occurring frictional heat, a granular agglomerate is formed which can again be used as starting material. The drawback of this heretofore device consists in that the crushing of the foil webs or foil waste in the beater mill as well as the processing operation in the dry mixer have to be controlled very carefully because, for instance, polyvinylchloride (PVC) foils are extremely sensitive with regard to too high a development of heat because at a certain excess temperature chemical reactions are initiated which change the character of the basic material. Therefore, with this heretofore known device, the mixing operation has to be particularly carefully controlled by the operator.

According to another heretofore known device, the foil or foil waste or residues are melted and are subsequently further processed to form the basic material. The melting of the foil web or foil waste can, however, be carried out only with such synthetic materials which, in view of the melting operation, will not lose their basic properties.

The drawback which is inherent to the heretofore known devices for refining foil webs or foil waste or residues of synthetic material consists in that the working operations need the attention of an operator, and furthermore the heretofore known devices are not usable for all kinds of synthetic materials.

It is, therefore, an object of the present invention to provide a device which will operate substantially automatically and continuously and which will be independent of the kind of synthetic material employed for the respective foil.

This object and other objects and advantages of the invention will appear more clearly from the following specification in connection with the accompanying drawings, in which:

FIG. 1 diagrammatically illustrates a regenerating plant according to the present invention.

Figure 1:
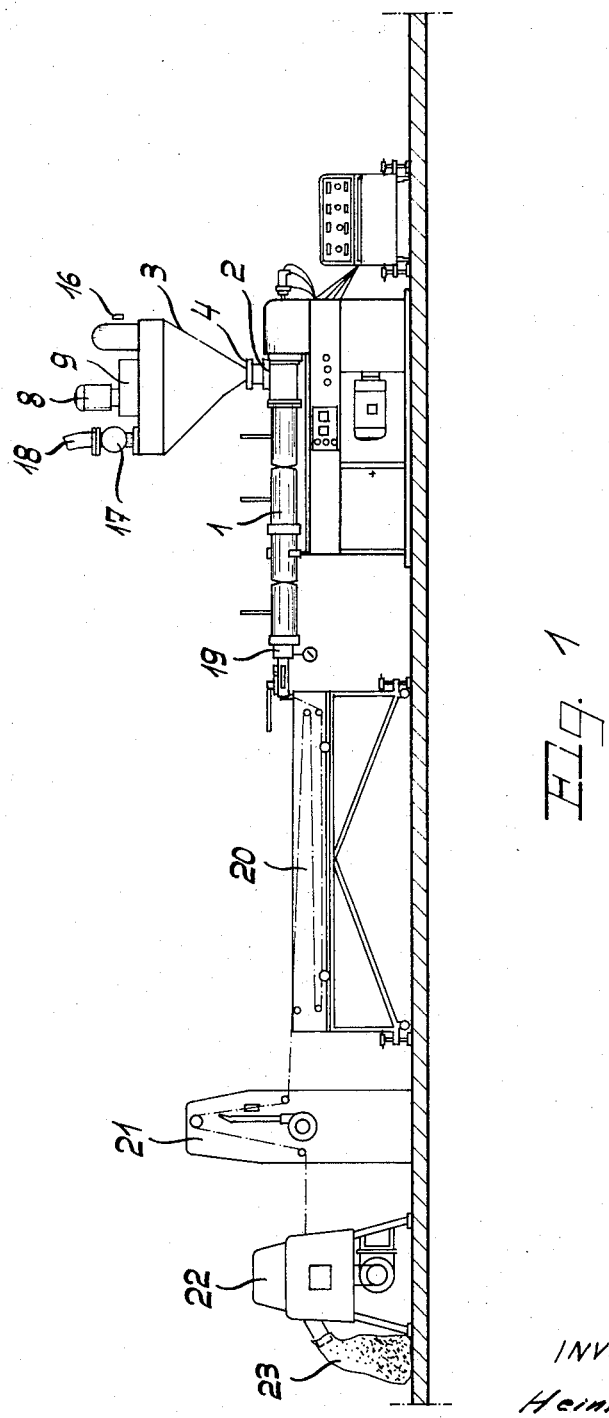
Figure 2:
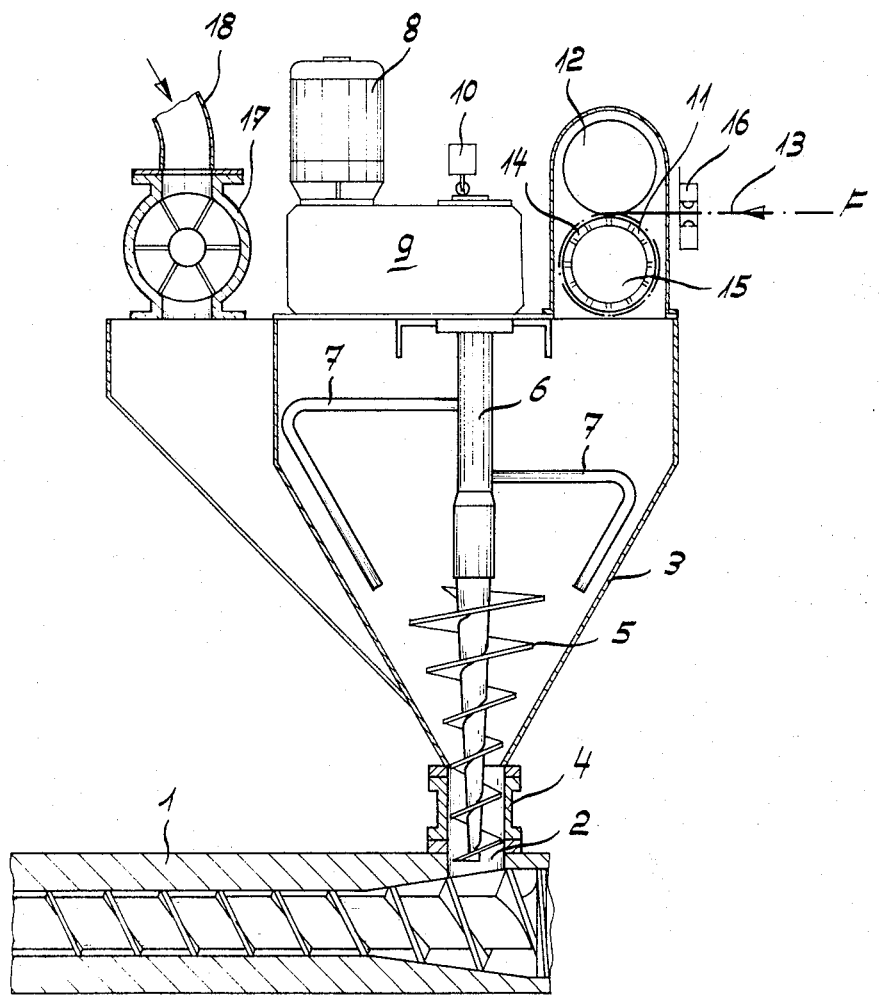
FIG. 2 illustrates on a somewhat larger scale than FIG. 1 a portion of the extruder of the plant of FIG. 1 together with the auxiliary devices associated therewith.

The device according to the present invention is characterized primarily in that a heated grate roller which is unilaterally journalled or is journalled at both ends cooperates with one or more outer pressure rollers while the bars or webs of the grate roller are sharp-edged at the surface of the roller and have a cross-section which increases toward the inner chamber of the grate roller and thus define free passages which toward the interior of the grate roller are of a funnel shape.

In order to be able to heat the individual grate bars or webs, they are, according to a further development of the invention, provided with a bore extending in the longitudinal direction thereof. Through these bores heated oil or, as an alternative, resistive wires for an electric heating may be passed. The individual grate bars define free passages the cross-section of which may vary. Thus, according to the invention, the cross-section may be rectangular, square, oval or circular, or of any other contour. For purposes of simplicity, the square or rectangular free passages are preferred.

According to a further feature of the invention, a conveying means, preferably a worm, extends into the interior of the roller, and the largest diameter of the worm is so selected that between the worm and the inner grate roller confinement there will remain a free chamber.

Referring now to the drawing in detail, a regenerating plant for the preparatory treatment of webs of foil of synthetic material according to the present invention comprises a regenerating extruder 1 having an inlet 2 to which is firmly connected a funnel-shaped supply or storage container 3. The connection between the extruder 1 and the supply container 2 is effected by a flange-like intermediate member 4. In the container 3 there is provided a worm 5 which tapers toward the extruder inlet 2. The worm 5 has an upwardly extending shaft 6 on which is mounted an agitator mechanism 7 for rotation with the worm 5. Worm 5 with agitator mechanism 7 is driven by a motor 8 through the interposed transmission 9. To safeguard the motor 8 in case the worm 5 is overloaded, there is provided a limit switch 10 which in such instance will turn off the motor 8. The foil material to be regenerated in the extruder 1 is first pretreated in a grate roller 11 with pressure roller 12. The pretreatment of the foils 13 entering in the direction of the arrow F is effected in such a way that by means of the grate roller 11 the foil web or foil strip is cut into individual sections while in view of the continuous winding-up of the web or strip material in cooperation with the heated grate bars, the cut off or separated sections are pressed against each other layer for layer and are fused to each other at the cutting edges. The thus fused together sections are through the free grate cross-sections 14 pressed in the form of a strand into the inner chamber 15 of the grate roller and from there are conveyed into the supply container 3 by standard tearing and conveying means. For purposes of checking the feeding of the material to be processed to the grate roller, a photoelectric cell 16 is provided serving as band checking means. The photoelectric cell 16 is coupled to the rotary trap 17 in such a way that when the band or strip tears off whereby automatically the supply of pretreated foil material to the container 3 is interrupted, the device 17 is automatically turned on and conveys through a pipe line 18 connected to a non-illustrated silo, for instance, polyethylene granulate or a polyvinylchloride mixture into the container 3. In this way it will be assured that the worm of the extruder 1 can always sufficiently be supplied with synthetic material so that a burning of the material will be prevented. As soon as the web or strip of foil material is again threaded into the grate roller 11, the device 17 will turn off.

If a disorder occurs in the operation of the plant or calender or if a change in the calender is to be effected, the extruder has to be stopped for a shorter or longer period of time. During a short interruption, the device 17 feeds corresponding PVC-material to the extruder. If a longer standstill period of the extruder is necessary, there exists the danger that the PVC-material in the extruder will in view of the longer stay be destroyed as far as its chemical structure is concerned and can no longer be used. In such an instance, instead of the PVC-material, high pressure polyethylene is supplied by the device 17 which material is non-sensitive against a longer stay in the worm. After the calender has again been started and strip material is again pressed into the extruder while the worm is in continuous operation, the oncoming PVC-material will press the polyethylene in the worm out of the latter. After a short period of operation, it is again possible to process polyvinylchloride foils in a continuous operation.

The material regenerated in the extruder 1 is discharged through a nozzle head 19 in the form of a bank and is then passed through a water bath 20. Subsequently, the thus regenerated material is conveyed over a drying path 21 and from there is passed into a granulator 22 which is coupled to a packing or a wrapping device which automatically closes the sack or bag 23 filled with granulate.

If the strip material directly coming from the calender is processed in the plant according to the present invention, the strand discharged through the nozzle head 19 of the extruder 1 can be directly conveyed to the calender for the purpose of making new foils.

Figure 3:
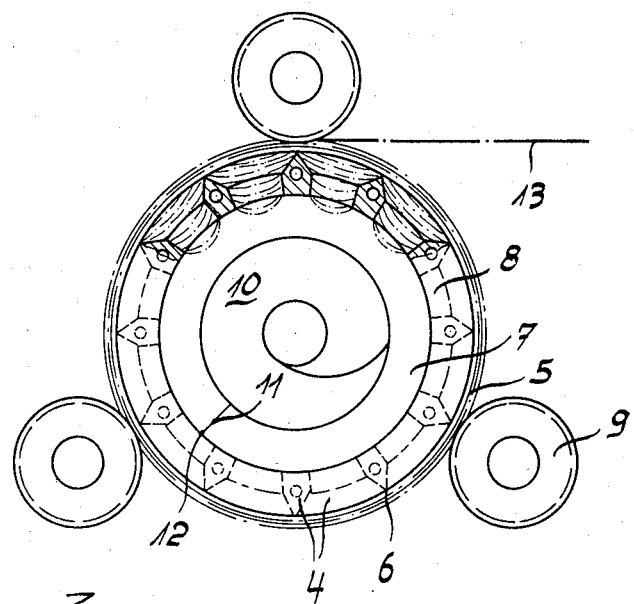
FIG. 3 represents a section through a grate roller for use in connection with the plant of FIG. 1, said section being taken along the line III — III of FIG. 4.
Figure 4:
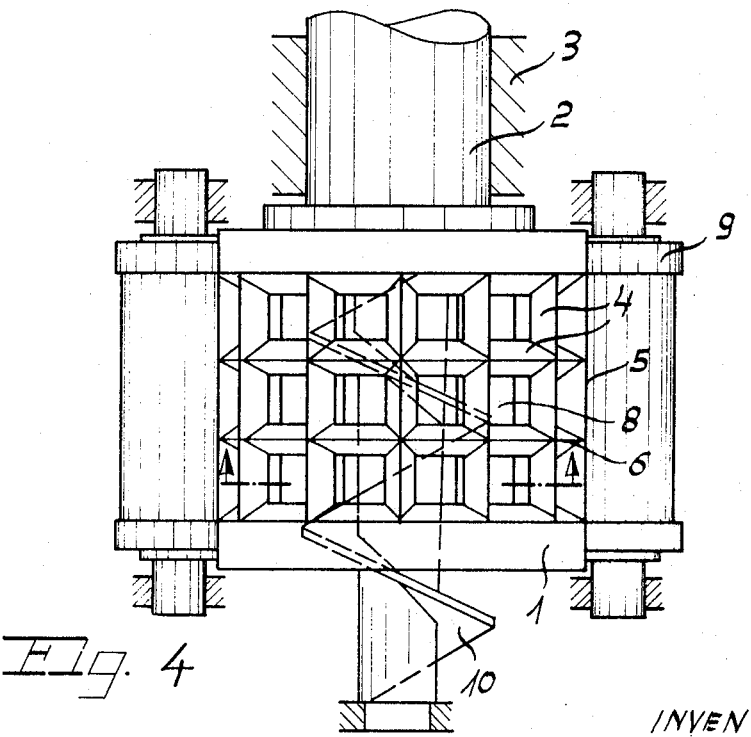
FIG. 4 is a view of FIG. 3 as seen in the direction of the arrow A in FIG. 3.

As shown more specifically in FIG. 4, the grate roller 11 is journalled at 3 by means of a shaft 22. Grate roller 11 comprises bars 24 which at their surface 25 have a sharp edge 26 and which have a cross-section that increases toward the inner chamber 15 of the grate roller. The enlargement of the cross-section of the grate bars 24, as is particularly clearly shown in FIG. 3, extends in this embodiment over a certain length only and then remains constant. Regardless of whether the increase in cross-section of the bars of grate roller 11 toward the interior 15 of the grate roller is continuous over the entire thickness of the roller or only over a portion thereof and then is constant, free passages 28 are formed which in view of the configuration of the cross-section of the bars 24 of the grate rollers are funnel-shaped or taper. As will be evident from FIG. 4, the bars or webs are so arranged with regard to each other that free passages of square cross-section are formed. The arrangement of the bars 24 may, however, also be such that passages of different cross-section, for instance, rectangular, oval or circular cross-section, are formed. The rectangular or square cross-section, however, is preferred. The pressure rollers 12 cooperate with the grate roller 11 and are offset with regard to each other by 120° as is best seen in FIG. 3. There exists, of course, also the possibility to employ only one or more than three pressure rollers 12. A conveyor, preferably a worm 10, cooperates with the grate roller 11. Worm 10 extends into the interior 15 of the grate roller and has its largest diameter D so diminished that a free space 31 is formed between the worm 30 and the inner configuration 11a of the grate roller.

The operation is as follows: The web of foil 13, for instance, a web of polyvinylchloride, is wound onto the grate roller 11, and in view of the continuously increasing layer thickness is pressed against the edges 26 of the bars 24 of the grate roller whereby the foil web is cut into individual sections. This cutting or division is facilitated by a heating effect produced by the bars 24. Simultaneously with the separation into individual foil sections at the edges 26 of the webs or bars 24, a fusing of the individual superimposed layers takes place which is aided by the corresponding configuration of the bars 24 and the formation of tapered free passages 28. During the continuous winding-up of the foil web 13 onto the grate roller 11 and the thus inherent separation of the web 13 into separate sections, individual strands 34 (FIG. 3) are formed which move through the free passages 28 of the grate roller 11 into the interior chamber 15 of the grate roller. Here the individual strands are grasped by the worm 30 and are divided into individual package-like structures and are subsequently conveyed to a supply or further processing station.

The heating up of the grate rollers may be effected in any suitable manner. For instance, the bars 24 may be provided with bores 35 through which heated-up oil is passed or into which heated-up rods or wires extend. The temperature of the grate bars 24 is such that the working of the foil is effected at temperatures of from 90° to 100°C.

In this way foil bands of any width can be processed. Prior to the bands hitting the grate rollers 11, the bands 13 must be laterally gathered if they are wider than the width of the grate roller. These steps, however, can be easily effected.

It is also advantageous that the entire winding-up and separating process can be so coupled with the discharge step that no more material is discharged than is wound up and divided into sections.

It is, of course, to be understood that the present invention is, by no means, limited to the construction shown in the drawings but also comprises any modifications within the scope of the appended claims.

What we claim is:

1. A device for the preparatory treatment of foil webs and foil strips of synthetic material for subsequent regeneration in an extruder, which includes: a rotatable grate roller having grate bars which are sharp-edged at their peripheral outer surface and increase in cross-section from their peripheral sharp edges in radial inward direction whereby adjacent grate bars define funnel-shaped passages, and means associated with said grate bars for heating the same, said grate roller having an inner axial chamber, and helical conveying means being such as to confine a free annular space with the wall of said inner chamber.

2. A device according to claim 1, in which said grate bars are provided with bores extending in the axial direction of said grate roller and adapted to receive heating means.

3. A device according to claim 1, in which roller portions adjacent to said grate bars define passages of substantially rectangular cross-section.

* * * * *